US007969938B2

(12) United States Patent
Kwak et al.

(10) Patent No.: US 7,969,938 B2
(45) Date of Patent: Jun. 28, 2011

(54) METHOD AND APPARATUS FOR PROVIDING MULTIMEDIA BROADCAST/MULTICAST SERVICE ACCORDING TO MOBILITY OF USER EQUIPMENT

(75) Inventors: No-Jun Kwak, Seoul (KR); Kyeong-In Jeong, Suwon-si (KR); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 530 days.

(21) Appl. No.: 11/315,275

(22) Filed: Dec. 23, 2005

(65) Prior Publication Data

US 2006/0140148 A1 Jun. 29, 2006

(30) Foreign Application Priority Data

Dec. 23, 2004 (KR) .................. 10-2004-0111534

(51) Int. Cl.
*H04W 4/00* (2009.01)
(52) U.S. Cl. .............. 370/329; 455/503; 455/414.1; 455/414.2; 455/436; 455/414.3; 370/321; 370/349; 370/352
(58) Field of Classification Search .............. 455/503, 455/432.1, 455, 442, 414.2, 414.1, 436, 414.3; 370/321, 329, 349, 352
See application file for complete search history.

(56) References Cited

U.S. PATENT DOCUMENTS

| 2001/0031638 | A1 | 10/2001 | Korpela et al. | |
| 2003/0157949 | A1* | 8/2003 | Sarkkinen et al. | 455/503 |
| 2004/0066774 | A1* | 4/2004 | Kawaguchi et al. | 370/349 |
| 2004/0081125 | A1 | 4/2004 | Ranta-Aho | |
| 2004/0152473 | A1* | 8/2004 | Kuwano et al. | 455/456.2 |
| 2004/0152476 | A1* | 8/2004 | Kuwano et al. | 455/459 |
| 2005/0030966 | A1* | 2/2005 | Cai et al. | 370/432 |
| 2005/0083961 | A1* | 4/2005 | Pecen et al. | 370/432 |
| 2005/0170842 | A1* | 8/2005 | Chen | 455/454 |
| 2005/0195852 | A1* | 9/2005 | Vayanos et al. | 370/437 |
| 2006/0034205 | A1* | 2/2006 | Kim | 370/312 |
| 2006/0039309 | A1* | 2/2006 | Lee et al. | 370/312 |

FOREIGN PATENT DOCUMENTS

| EP | 1 392 075 A1 | 2/2004 |
| JP | 2002-171548 | 6/2002 |
| JP | 2005-536142 | 11/2005 |
| KR | 2004-0016540 | 2/2004 |
| KR | 10-2004-0084062 | 10/2004 |
| KR | 2004-0084062 | 10/2004 |
| KR | 2004-0096750 | 11/2004 |
| KR | 10-2005-0007823 | 1/2005 |
| RU | 2 232 472 | 7/2004 |
| WO | WO 2004-017580 A1 | 8/2003 |
| WO | WO-2004-017580 A1 | 2/2004 |
| WO | 2004/064342 | 7/2004 |
| WO | WO 2005-018098 | 2/2005 |
| WO | WO 2005-020474 | 3/2005 |

* cited by examiner

*Primary Examiner* — Kwasi Karikari
(74) *Attorney, Agent, or Firm* — Roylance, Abrams, Berdo & Goodman, LLP

(57) ABSTRACT

A method and apparatus for notifying a UE of the PFLs of MBMS services in a new cell when the UE moves from an old cell to a new cell in a CELL_DCH state in the case of FLC are provided. An SRNC informs the UE of the PFLs of UE-joined MBMS services in the new cell. If the new cell is managed by a DRNC, the DRNC informs the SRNC of the PFLs of the UE-joined MBMS services and the SRNC transmits the PFL information to the UE so that the UE can move to a corresponding PFL.

24 Claims, 9 Drawing Sheets

METHOD AND APPARATUS FOR PROVIDING MULTIMEDIA BROADCAST/MULTICAST SERVICE ACCORDING TO MOBILITY OF USER EQUIPMENT

PRIORITY

This application claims the benefit under 35 U.S.C. §119(a) of Korean Patent Application No. 2004-111534, filed in the Korean Intellectual Property Office on Dec. 23, 2004, the entire contents of which are hereby incorporated by reference.

BACKGROUND OF THE INVENTION

1. Field of the Invention

The present invention relates generally to Multimedia Broadcast/Multicast Service (MBMS). More particularly, the present invention relates to a method of informing User Equipment (UE) in a CELL_Dedicated CHannel (DCH) state of Preferred Frequency Layer (PFL) information when a session starts in Frequency Layer Convergence (FLC) being the process where UE is requested to preferentially select the frequency layer on which the desired MBMS service is intended to be transmitted.

2. Description of the Related Art

Owing to today's development of communication technology, Wideband Code Division Multiple Access (WCDMA) mobile communication systems are evolving beyond traditional voice service toward multimedia broadcasting/communications to transmit a large amount of data in packet service and multimedia service. To support multimedia broadcasting/communications, MBMS is under consideration which provides services from one or more multimedia data sources to multiple UEs.

MBMS is a service for transmitting the same multimedia data to a plurality of recipients over a wireless network. Because recipients of an MBMS service share one radio channel, radio transmission resources are saved. MBMS services enable transmission of multimedia data including real-time video and audio data, still images, and text. Multimedia transmission requires a large amount of radio transmission resources. Since an MBMS service transmits the same data to a plurality of cells where users are located, it is provided in a Point-to-Point (PTP) or Point-to-Multipoint (PTM) mode depending on the number of users in each cell.

FIG. 1 schematically illustrates nodes involved in providing an MBMS service in a mobile communication network. The MBMS service is provided in a 3rd Generation Project Partnership (3GPP) system based on Global System for Mobile Communications (GSM) and General Packet Radio Services (GPRS), compliant with the 3G asynchronous mobile communication standards, by way of example.

Referring to FIG. 1, UE components 161, 162, 163, 171 and 172 are MBMS-enabled terminals or MBMS subscribers. First and second cells 160 and 170 (Cell 1 and Cell 2) are physical or logical service areas under control of Node Bs which transmit wireless MBMS data to subscribers. A Radio Network Controller (RNC) 140 controls the plurality of cells 160 and 170 and selectively transmits MBMS data to a particular cell. It also controls radio channels established for MBMS services. The RNC 140 is connected to UEs 161 to 172 via Radio Resource Control (RRC) interfaces.

The RNC 140 is connected to a Packet-Switched or Packet Service (PS) network (not shown) such as the Internet through a Serving GPRS Support Node (SGSN) 130. Communications are conducted between the RNC 140 and the PS network by PS signaling. The connection between the RNC 140 and the SGSN 130 is called an Iu-PS interface. The SGSN 130 controls MBMS services for each subscriber. The main functions of the SGSN 130 include management of service billing data for each subscriber and selective transmission of multimedia data to the RNC 140.

A transit network 120 provides a communication path between a Broadcast Multicast-Service Center (BM-SC) 110 and the SGSN 130. The transit network 120 can be connected to an external network through a Gateway GPRS Support Node (GGSN: not shown). The BM-SC 110, which is an MBMS data source, is responsible for scheduling MBMS data.

The RNC 140 is connected to a Circuit-Switched (CS) network (not shown) through a Mobile Switching Center (MSC) 150. The CS network is a legacy connection-based voice-oriented communication network. Communications are conducted between the RNC 140 and the MSC 150 by CS signaling. The connection between the RNC 140 and the MSC 150 is called an Iu-CS interface.

MBMS data streams from the BM-SC 110 are delivered to UEs 161 to 172 through the transit network 120, the SGSN 130, the RNC 140, and Node Bs/cells 160 and 170.

While not shown, a plurality of SGSNs may participate in one MBMS service and a plurality of RNCs may exist for each SGSN. Each SGSN selectively transmits data to the RNCs and each RNC selectively transmits to cells. For this purpose, the SGSN and the RNC store lower-layer node lists (an RNC list for the SGSN and a cell list for the RNC) in which the nodes are to receive MBMS data.

MBMS systems support FLC technology for allocating a PFL to each available MBMS service and requesting UEs to preferentially select to the frequency layer on which their desired MBMS service is intended to be transmitted. FLC information, that is, PFL information indicates a PFL per MBMS service.

FIG. 2 illustrates an exemplary cell configuration in an MBMS system when FLC technology is applied.

Referring to FIG. 2, three cells 221, 222 and 223 (Cell 1, Cell 2 and Cell 3) using different frequencies, Frequency 1, Frequency 2 and Frequency 3, are spatially overlapped. Before an MBMS service session starts, a plurality of UEs 211 to 214 camp on cells 221, 222 and 223. In the illustrated case of FIG. 2, frequency 2 of Cell 2 is set as the PFL of the MBMS service.

A Core Network (CN) 201 covers a BM-SC, a transit network, and MSC and an SGSN. CN 201 is connected to first and second RNCs 202 and 203 (RNC 1 and RNC 2) that manage cells 221, 222 and 223. Wired links 231 between the CN 201 and RNCs 202 and 203 are Iu interfaces, and wired link 232 between RNCs 202 and 203 is an Iur interface. While not shown, Node Bs exist between the RNC 203 and UEs 211 to 214 and directly manage the UEs 211 to 214. The RNC 203 is a Drift RNC (DRNC) that directly manages cells 221, 222 and 223 having the UEs 211 to 214, while the RNC 202 is a Serving RNC (SRNC) that controls radio resources for the UEs 211 to 214.

Typically, UE in a CELL_DCH state where a dedicated channel is established for the UE does not read an MBMS Control CHannel (MCCH) delivering FLC information. Therefore, when the UE moves from one cell to another it has no knowledge of the PFLs of MBMS services (hereinafter UE-joined services), which the UE joined and of which the sessions have started. As a result, seamless MBMS service reception is impossible.

SUMMARY OF THE INVENTION

Accordingly, an object of the present invention is to substantially solve at least the above problems and/or disadvantages and to provide at least the advantages below. Another object of the present invention provides a method and apparatus for informing a UE of the PFLs of UE-joined services in the new cell in an SRNC when the UE having a dedicated channel moves to a new cell.

Another object of the present invention provides a method and apparatus for explicitly informing an SRNC of the PFLs of UE-joined services in the cell in the DRNC when a CELL_DCH UE moves to a cell managed by a DRNC.

Still another object of the present invention provides a method and apparatus for informing an SRNC of the PFLs of UE-joined services that a CELL_DCH UE wants to receive using a UE-dedicated signaling bearer on an Iur interface in a DRNC.

And another object of the present invention provides a method and apparatus for determining whether a UE having a dedicated channel is to select another frequency layer by explicitly informing the UE of the PFLs of particular UE-joined services in an SRNC having knowledge of the PFLs.

According to one aspect of the present invention, in a method of providing an MBMS service to a UE in an SRNC, the SRNC detects movement of the UE wanting to receive the MBMS service from a first cell to a second cell and requests setup or addition of a radio link for the UE to a DRNC which controls the second cell. The SRNC receives PFL information indicating the PFL of at least one MBMS service which the UE has joined and which the session has started from the DRNC when the radio link setup or addition is completed. The SRNC transmits the received PFL information to the UE.

According to another aspect of the present invention, in a method of providing an MBMS service to a UE in a DRNC, the DRNC receives a radio link setup or additional request for the UE from an SRNC, when the UE moves to a cell controlled by the DRNC during receipt of the MBMS service. The DRNC checks PFL information indicating the PFL of at least one MBMS service which the UE has joined and of which the session has started and transmits the PFL information to the SRNC.

According to a further aspect of the present invention, for providing an MBMS service to a UE, a UE mobility manager detects movement of the UE wanting to receive the MBMS service to a new cell controlled by a DRNC and determines whether the new cell is managed by the UE mobility manager. An interface transmits a radio link setup or additional request message to the DRNC and receives a response message including PFL information indicating the PFL of at least one MBMS service which the UE has joined and of which the session has started in the new cell from the DRNC. An FLC controller manages the PFL information and an RRC transmitter and receiver transmits the PFL information to the UE.

BRIEF DESCRIPTION OF THE DRAWINGS

The above and other objects, exemplary features and advantages of the present invention will become more apparent from the following detailed description when taken in conjunction with the accompanying drawings, in which.

Throughout the drawings, like reference numbers should be understood to refer to like elements, features, and structures.

DETAILED DESCRIPTION OF EXEMPLARY EMBODIMENTS

Preferred exemplary embodiments of the present invention will be described herein below with reference to the accompanying drawings. The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

The subject matter of the present invention can enable a UE having a dedicated channel, that is, in a CELL_DCH state to receive a continuous, seamless MBMS session while roaming between cells, an SRNC delivers information about the PFLs of UE-joined services to the UE on a dedicated channel and if the SRNC is different from a DRNC, the DRNC transmits to the SRNC information about the PFLs of a cell where the UE is located. The UE-joined services are defined as MBMS services which the UE has joined and of which the sessions have started, in other words, MBMS services that the UE want to receive.

Figure 1:
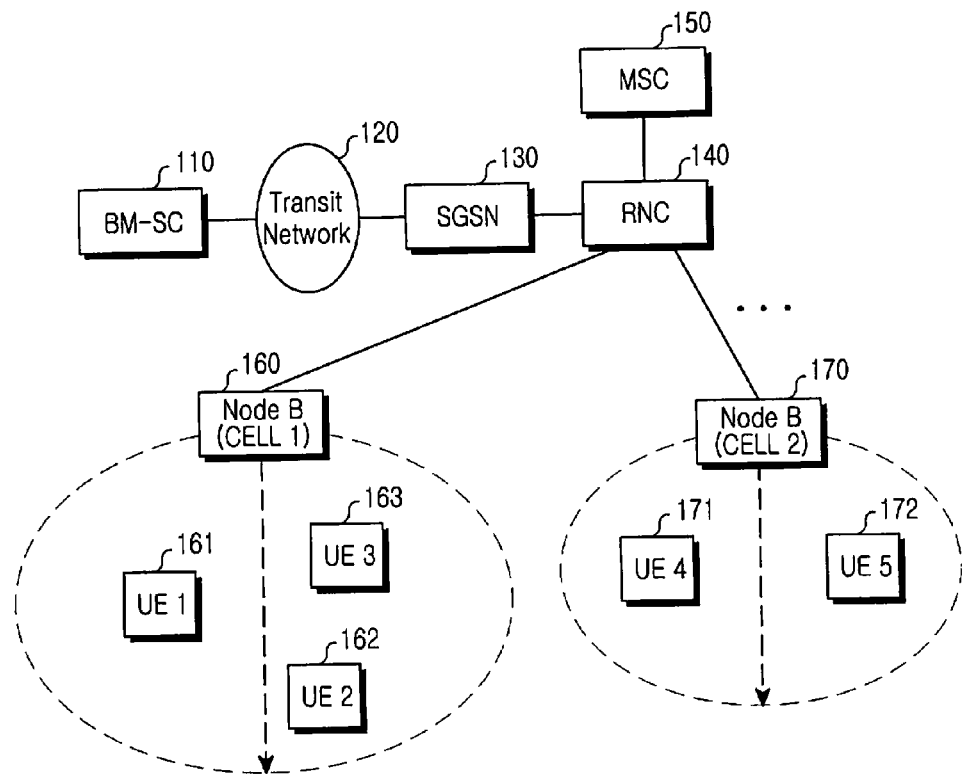
FIG. 1 illustrates a network configuration for providing an MBMS service.
Figure 2:
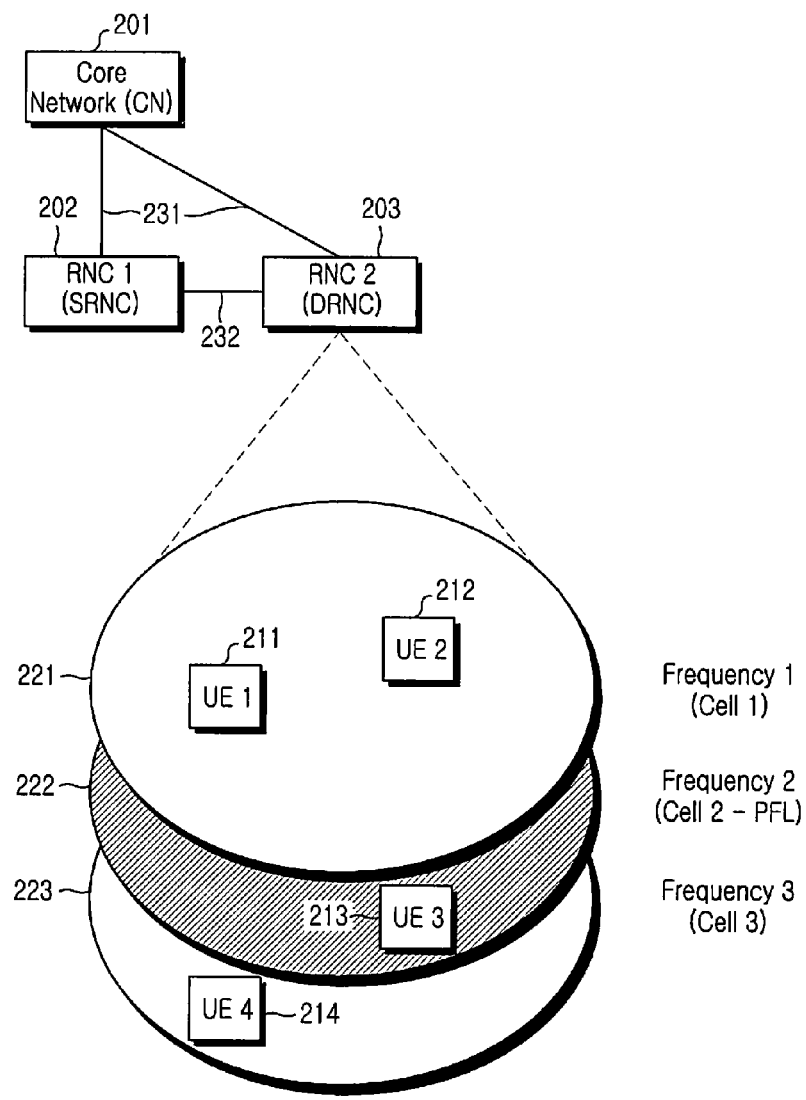
FIG. 2 illustrates cell status when FLC is applied.
Figure 3:
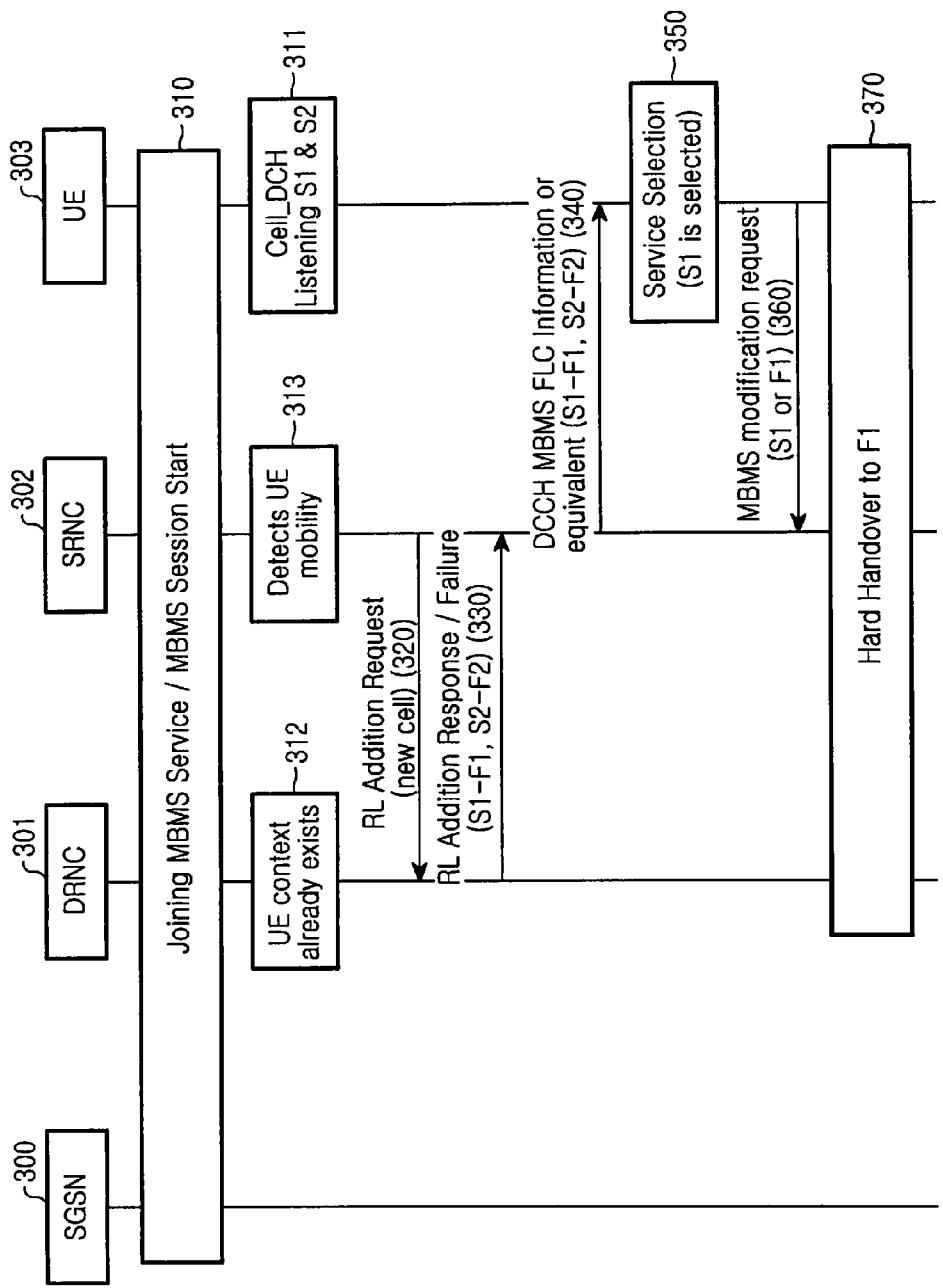
FIG. 3 is a diagram illustrating a message flow between RNCs and a UE according to a preferred exemplary embodiment of the present invention.

FIG. 3 is a diagram illustrating a message flow between RNCs and a UE according to a preferred exemplary embodiment of the present invention.

Referring to FIG. 3, a UE 303 joins particular MBMS services by transmitting Non-Access Stratum (NAS) messages to an SGSN 300, and the SGSN 300 performs an MBMS Session Start procedure for notifying a DRNC 301 and SRNC 302 of the start of sessions for the MBMS services in step 310. Thus, the MBMS services start to be provided in each cell. In step 311, the UE 303 receives MBMS services S1 and S2 simultaneously in a cell managed by the DRNC 301 in a CELL_DCH state where a dedicated channel has been established for the UE 303. The DRNC 301 already has a UE context associated with the UE-joined MBMS services in step 312.

If an intra-DRNC mobility occurs, that is, if the UE 303 moves to another cell managed by the DRNC 301, the SRNC 302 detects the mobility of the UE 303 in step 313 and requests the DRNC 301 to add a radio link to the new cell by an RL ADDITION REQUEST message in step 320.

Upon receipt of the RL ADDITION REQUEST message, the DRNC 301 checks the PFLs of the UE-joined services in the new cell from the UE context and transmits an RL ADDITION RESPONSE or RL ADDITION FAILURE message comprising PFL information indicating the PFLs to the SRNC 302 in step 330. If the addition of a radio link between the new cell and the UE 303 is successful, the RL ADDITION RESPONSE message is transmitted to the SRNC 302. On the other hand, if the radio link addition has failed, the RL ADDITION FAILURE message is transmitted to the SRNC 302. In the exemplary embodiment illustrated by FIG. 3, it is assumed that frequency F1 and frequency F2 can be set as the PFLs of the MBMS services S1 and S2, respectively, in the new cell. Therefore, the PFL information contains "S1-F1" and "S2-F2".

Upon receipt of the RL ADDITION RESPONSE message from the DRNC 301, the SRNC 302 transmits a Radio Resource Control (RRC) message comprising the PFL information to the UE 303 on a DCCH in step 340. The RRC message can be an MBMS MODIFIED SERVICE INFORMATION or MBMS FLC INFORMATION. MBMS MODIFIED SERVICE INFORMATION is a message used when an MBMS session starts in a cell or channel information is changed. In accordance with an exemplary embodiment of the present invention, this message is used to explicitly notify a UE in the CELL_DCH state of the PFL information of a new cell.

In step 350, the UE 303 selects a desired MBMS service and the PFL of the MBMS service according to its service priority, referring to the PFL information. When the frequency layer of the MBMS service has changed, the UE 303 transmits an MBMS MODIFICATION REQUEST message comprising the service identifier (ID) or PFL of the selected MBMS service (S1 or F1 herein) to the SRNC 302 in step 360. In step 370, the SRNC 302 moves the UE 303 to the frequency layer F1 by a handover procedure.

Figure 4:
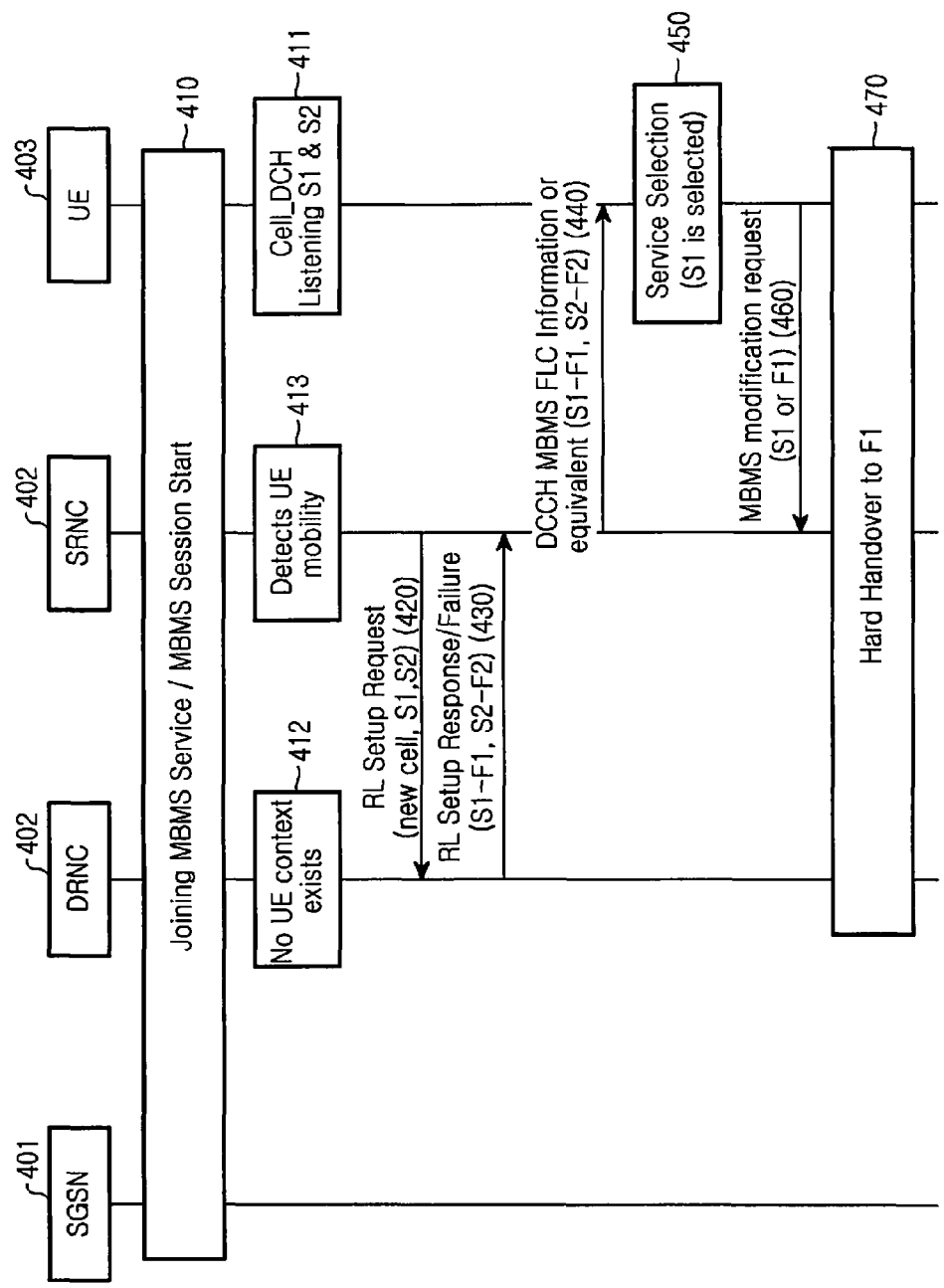
FIG. 4 is a diagram illustrating a message flow between RNCs and a UE according to another preferred exemplary embodiment of the present invention.

FIG. 4 is a diagram illustrating a message flow between RNCs and a UE according to another preferred exemplary embodiment of the present invention.

Referring to FIG. 4, a UE 403 joins particular MBMS services by transmitting NAS messages to an SGSN 400 and the SGSN 400 performs an MBMS Session Start procedure for notifying a DRNC 401 and an SRNC 402 of the start of sessions for the MBMS services in step 410. Thus, the MBMS services start to be provided in each cell.

In step 411, the UE 403 receives MBMS services S1 and S2 simultaneously in a cell managed by the DRNC 401 in a CELL_DCH state where a dedicated channel has been established for the UE 403. In the exemplary embodiment illustrated by FIG. 4, an initial inter-RNC mobility to the cell managed by the DRNC 401 is assumed. Therefore, the DRNC 401 doesn't have a UE context associated with the MBMS services that the UE 403 has joined in step 412.

If the SRNC 402 detects an inter-RNC mobility of the UE 403 in step 413, the SRNC 402 transmits an RL SETUP REQUEST message to the DRNC 401 in step 420. At the same time, the SRNC 402 transmits a list of the UE-joined MBMS services. The DRNC 401 generates a UE context and stores the MBMS service list in the UE context. While not shown, in the absence of MBMS contexts associated with the joined MBMS services, the DRNC 401 requests the MBMS contexts to the SGSN 400 by an MBMS Registration procedure and links the UE 403 to the MBMS contexts by an Attach procedure.

In step 430, the DRNC 401 transmits to the SRNC 402 an RL SETUP RESPONSE or RL SETUP FAILURE message comprising the PFLs of the UE-joined services in the new cell to which the UE 403 moves.

Upon receipt of the RL SETUP RESPONSE message, the SRNC 402 transmits an RRC message comprising the PFL information to the UE 403 on a DCCH in step 440. The RRC message can be MBMS MODIFIED SERVICE INFORMATION or MBMS FLC INFORMATION. MBMS MODIFIED SERVICE INFORMATION is a message used when an MBMS session starts in a cell or channel information is changed. In accordance with an exemplary embodiment of the present invention, this message is used to explicitly notify a UE in the CELL_DCH state of the PFL information of a new cell.

In step 450, the UE 403 selects a desired MBMS service and the PFL of the MBMS service according to its service priority, referring to the PFL information. In the case where the frequency layer of the MBMS service is changed, the UE 403 transmits an MBMS MODIFICATION REQUEST message comprising the service ID or PFL of the selected MBMS service to the SRNC 402 in step 460. In step 470, the SRNC 402 moves the UE 403 to the frequency layer F1 by a handover procedure.

Table 1 below illustrates an example of an MBMS FLC INFORMATION IE set in the RL ADDITION RESPONSE/FAILURE message transmitted in step 330, the RL SETUP RESPONSE/FAILURE message transmitted in step 430, and the MBMS FLC INFORMATION message transmitted in step 340 and 440.

The MBMS FLC INFORMATION IE comprises a downlink Universal Terrestrial Radio Access (UTRA) Absolute Radio Frequency Channel Number (DL UARFCN) and a Temporary MBMS Group Identity (TMGI) as an MBMS service ID for each UE-related MBMS service. The DL UARFCN represents a frequency layer.

The MBMS FLC INFORMATION IE is delivered in the RL ADDITION RESPONSE/FAILURE message, the RL SETUP RESPONSE/FAILURE message, and the MBMS FLC INFORMATION message. To optimize the sizes of these messages, the frequency most selected as a PFL for cells where CELL_DCH UEs are located can be excluded from the MBMS FLC INFORMATION IE.

TABLE 1

| IE/Group Name | Presence | Range | IE Type and Reference | Semantics Description |
|---|---|---|---|---|
| MBMS FLC Information | | 1 | | |
| >Preferred Frequency | | 0 ... <MaxNumFreq> | | |
| >>DL UARFCN | M | 1 | | Downlink UTRA Absolute Radio Frequency Channel Number |
| >>TMGI | M | 1 ... <MaxNumMBMSService> | | Temporary MBMS Group Identity (Unique for an MBMS service). List of MBMS services of which the PFLs are set as DL UARFCN |

Table 2 below illustrates an example of the MBMS FLC INFORMATION message transmitted as an RRC message in steps 340 and 440. The MBMS FLC INFORMATION message comprises the ID of a cell to which FLC is applied and the MBMS FLC INFORMATION IE of Table 1. This message is delivered on a dedicated channel by RRC.

TABLE 2

| IE/Group Name | Need | Type and Multi Reference | Semantics Description |
|---|---|---|---|
| Message type | | | |
| Cell id | MP | 1 | Cell ID of the new cell |
| MBMS FLC INFORMATION | MP | 1 | Refer to Table 1 |

Figure 5:
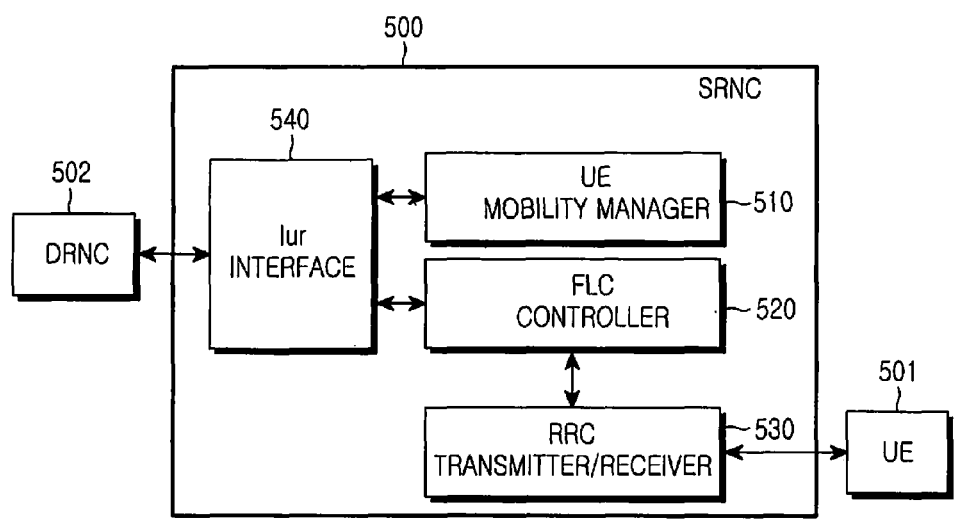
FIG. 5 is a block diagram of an SRNC according to a preferred exemplary embodiment of the present invention.

FIG. 5 is a block diagram of an SRNC according to a preferred exemplary embodiment of the present invention.

Referring to FIG. 5, an SRNC 500 comprises a UE mobility manager 510, an FLC controller 520, an RRC transmitter/receiver 530, and an Iur interface 540 according to a preferred exemplary embodiment of the present invention.

The UE mobility manager 510 detects the mobility of a UE 501 and determines whether the UE 501 is located in a cell managed by the SRNC 500. If the UE 501 requests movement to another cell, the UE mobility manager 510 sets up or adds a radio link connecting the UE 501 to a DRNC 502. The FLC controller 520 manages the PFLs of UE-joined services and controls the FLC operation of the UE 501. The RRC transmitter/receiver 530 transmits/receives RRC messages to/from the UE 501. The Iur interface 540 interfaces between the SRNC 500 and the DRNC 502.

Figure 6:
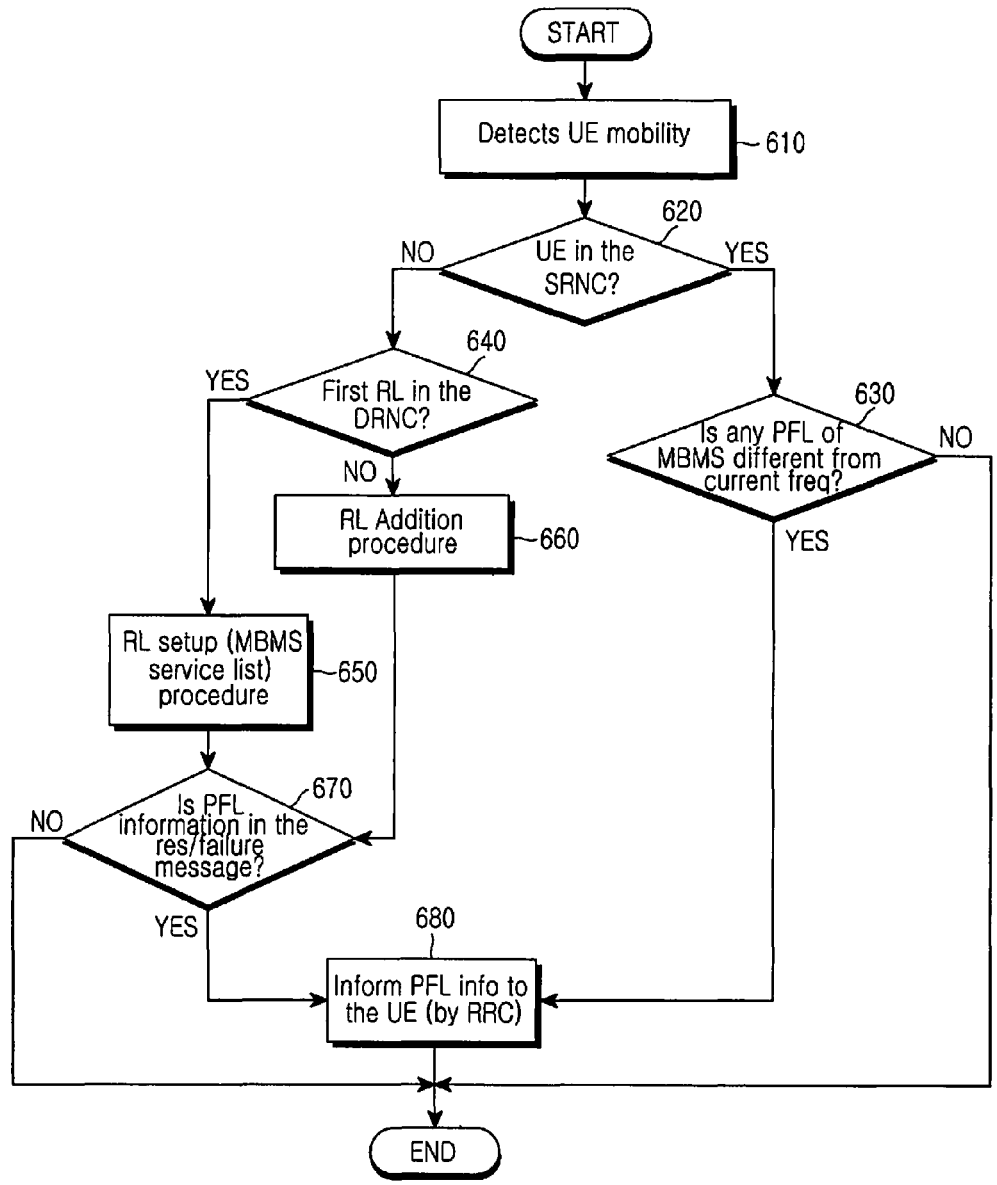
FIG. 6 is a flowchart illustrating an operation of the SRNC according to a preferred exemplary embodiment of the present invention.

FIG. 6 is a flowchart illustrating an operation of the SRNC illustrated in FIG. 5 according to a preferred exemplary embodiment of the present invention.

Referring to FIG. 6, upon detection of the UE's movement to a new cell in step 610, the UE mobility manager 510 determines whether the new cell is its managed cell by communicating with the DRNC 502 via the Iur interface 540 in step 620. If the new cell is managed by the UE mobility manager 510, the FLC controller 520 checks the PFLs of all UE-joined services of the UE 501 in step 630.

If the PFLs of the UE-joined services are identical to frequency layers used in the new cell, the procedure ends without any further processing. On the other hand, if at least one of the PFLs does not match any of the frequency layers used in the cell, the procedure goes to step 680.

In step 680, the RRC transmitter/receiver 530 notifies the UE 501 of the PFLs of the UE-joined services by an RRC message on a DCCH in step 680. The RRC message can be MBMS MODIFIED SERVICE INFORMATION or MBMS FLC INFORMATION.

If the new cell is not managed by the UE mobility manager 510 in step 620, the UE mobility manager 510 determines whether a radio link exists between the DRNC 502 and the UE 501 in step 640. In the absence of the radio link, that is, if the UE 501 moves to a cell managed by the DRNC 502 for the first time, the UE mobility manager 510 transmits an RL SETUP REQUEST message requesting setup of a radio link to the DRNC 502 via the Iur interface 540 in step 650.

In the presence of a radio link between the DRNC 502 and the UE 501, the UE mobility manager 510 transmits an RL ADDITION REQUEST message requesting addition of a radio link to the DRNC 502 via the Iur interface 540 in step 660. Upon receipt of an RL SETUP/ADDITION RESPONSE/FAILURE message from the DRNC 501 via the Iur interface 540, the FLC controller 520 determines whether the received RL SETUP/ADDITION RESPONSE/FAILURE message comprises an MBMS FLC INFORMATION IE providing FLC information in step 670.

In the presence of the MBMS FLC INFORMATION IE, the FLC controller 520 transmits an RRC message comprising the FLC information to the UE 501 through the RRC transmitter/receiver 530 in step 680. On the other hand, in the absence of the MBMS FLC INFORMATION IE, the SRNC 500 ends the procedure without any further processing.

Figure 7:
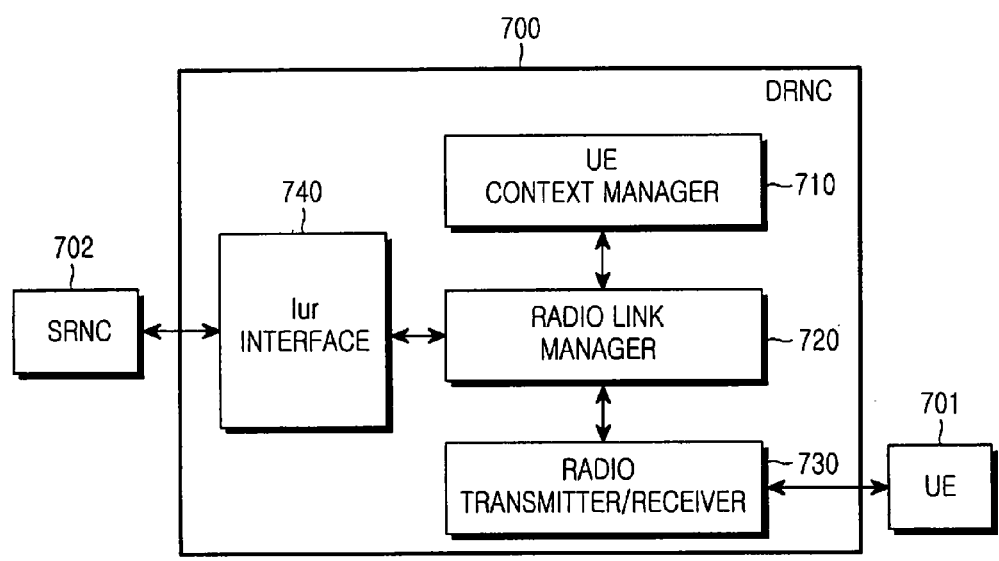
FIG. 7 is a block diagram of a DRNC according to a preferred exemplary embodiment of the present invention.

FIG. 7 is a block diagram of a DRNC according to a preferred exemplary embodiment of the present invention.

Referring to FIG. 7, a DRNC 700 comprises a UE context manager 710, a radio link manager 720, a radio transmitter/receiver 730, and an Iur interface 740 according to a preferred exemplary embodiment of the present invention.

The UE context manager 710 manages a UE context comprising information about a UE 701. The UE context may contain IDs of the MBMS services that the UE 701 has joined and PFL information indicating the PFLs of the MBMS services. The radio link manager 720 receives an RL SETUP/ADDITION REQUEST message from an SRNC 702 via the Iur interface 740 and replies with an RL RESPONSE/FAILURE message. The radio transmitter/receiver 730 sets up or adds a radio link for the UE 701 upon request from the radio link manager 720 which has received the RL SETUP/ADDITION REQUEST message and provides MBMS data to the UE 701 via the radio link.

Figure 8:
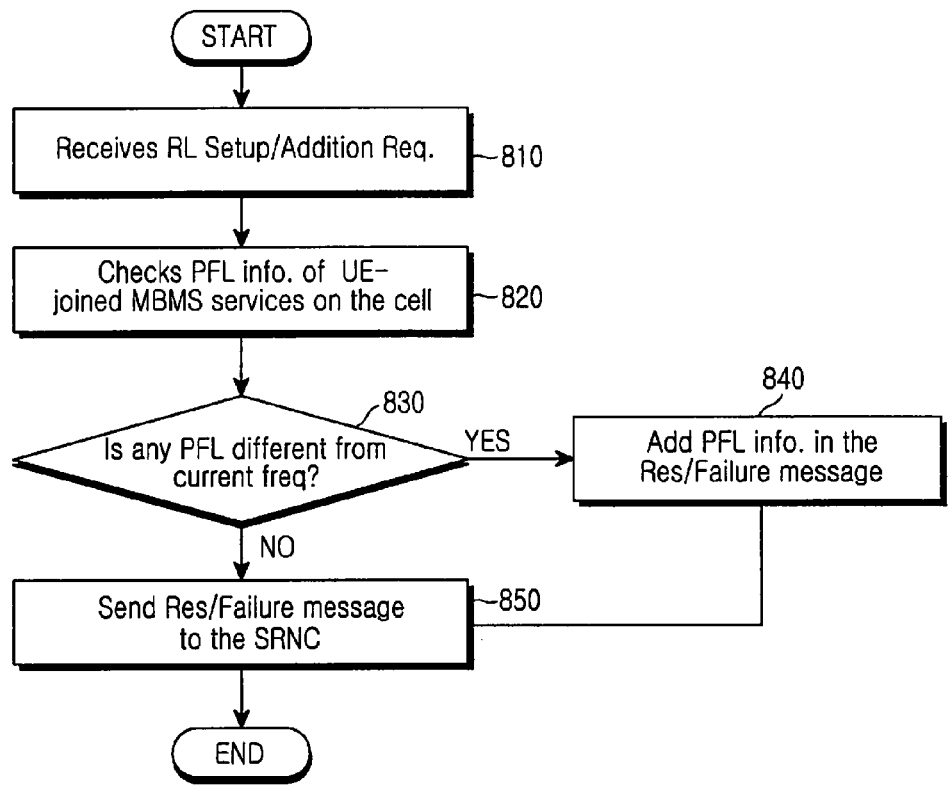
FIG. 8 is a flowchart illustrating an operation of the DRNC according to a preferred exemplary embodiment of the present invention.

FIG. 8 is a flowchart illustrating an operation of the DRNC illustrated in FIG. 7 according to a preferred exemplary embodiment of the present invention.

Referring to FIG. 8, the radio link manager 720 receives an RL SETUP/ADDITION REQUEST message from the SRNC 702 via the Iur interface 740 in step 810 and checks in a stored UE context the PFLs of UE-joined services in a cell for which a radio link is to be set up or added in step 820.

In step 830, the radio link manager 720 compares the PFLs of the UE-joined services with the frequency layers used in the cell. If they are identical, the radio link manager 720 sets up or adds a radio link for the UE 701, and the radio transmitter/receiver 730 transmits an RL RESPONSE/FAILURE message to the SRNC 702 via the Iur interface 740 in step 850.

If at least one of the PFLs does not match to any of the frequency layers used in the cell, the radio link manager 720 sets up or adds a radio link for the UE 701 and the radio transmitter/receiver 730 transmits an RL RESPONSE/FAILURE message comprising PFL information as illustrated in Table 1 to the SRNC 702 via the Iur interface 740 in steps 840 and 850.

Figure 9:
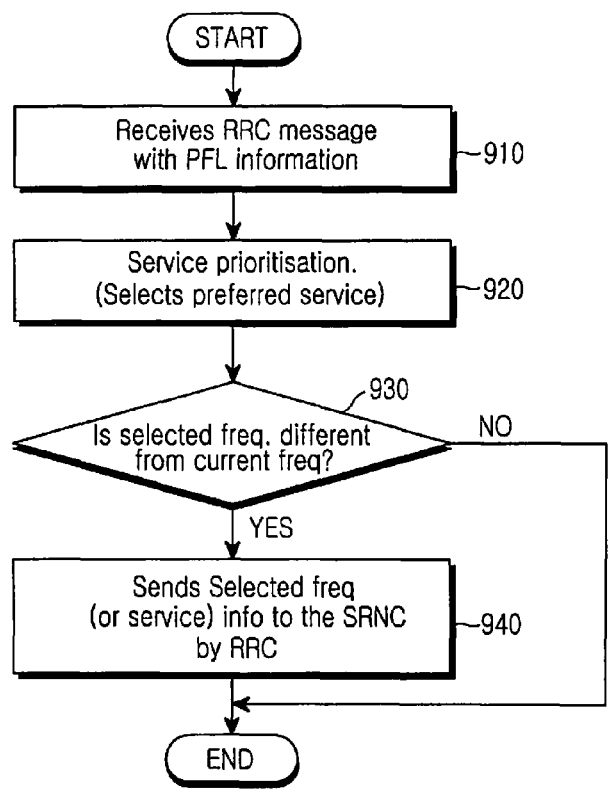
FIG. 9 is a flowchart illustrating an operation of the UE according to a preferred exemplary embodiment of the present invention.

FIG. 9 is a flowchart illustrating an operation of the UE according to a preferred exemplary embodiment of the present invention.

Referring to FIG. 9, the UE receives an RRC message, MBMS FLC INFORMATION or MBMS MODIFIED SERVICE INFORMATION on a dedicated channel from the SRNC in step 910. The MBMS FLC INFORMATION or MBMS MODIFIED SERVICE INFORMATION message comprises PFL information. In step 920, the UE reads the PFL information from the received message and selects a PFL or an MBMS service.

The UE compares the PFL of the selected MBMS service with a frequency in current use in step 930. If they are different, the UE notifies the SRNC of the selected PFL or MBMS service by an RRC message on a dedicated channel in step 940. If they are identical, the UE ends the procedure.

In accordance with the exemplary embodiments of present invention described above, when a UE moves from one cell to another while receiving an MBMS service in a CELL_DCH state, an SRNC notifies the UE of the PFLs of UE-related MBMS services in the new cell on a dedicated channel.

If the DRNC of the UE is different from the SRNC, the DRNC transmits the PFL information of the UE-joined services to the SRNC so that the SRNC transmits the PFL information to the UE. Therefore, the UE can receive the MBMS service continuously in the new cell.

While the present invention has been particularly shown and described with reference to certain preferred exemplary embodiments thereof, it will be understood by those of ordinary skill in the art that various changes in form and detail may be made therein without departing from the spirit and scope of the present invention as defined by the appended claims.

What is claimed is:

1. A method of providing a multimedia broadcast/multicast service (MBMS) service to user equipment (UE) in a serving radio network controller (SRNC), the method comprising:
   detecting, by the SRNC, movement of the UE from a first cell to a second cell, the UE configured to receive the MBMS service;
   requesting, by the SRNC, setup or addition of a radio link for the UE to a drift radio network controller (DRNC) which controls the second cell;
   upon requesting the setup or addition of a radio link to the DRNC, receiving, by the SRNC, preferred frequency layer (PFL) information indicating the PFL of at least one MBMS service which the UE has joined and of which the at least one MBMS service has started from the DRNC; and
   transmitting, by the SRNC, the received PFL information to the UE.

2. The method of claim 1, wherein the PFL information comprises a downlink universal terrestrial radio access (UTRA) absolute radio frequency channel number (DL UARFCN) indicating the PFL of the at least one MBMS service, and a temporary MBMS group identity (TMGI) indicating the ID of the at least one MBMS service.

3. The method of claim 1, wherein the PFL information is included in a radio link setup response message.

4. The method of claim 1, wherein the PFL information is included in a radio link addition response message.

5. The method of claim 1, wherein the radio link setup or addition requesting step comprises transmitting a radio link setup request message to the DRNC in the absence of a radio link for the UE in the DRNC.

6. The method of claim 1, wherein the radio link setup or addition requesting step comprises transmitting a radio link addition request message to the DRNC in the presence of a radio link for the UE in the DRNC.

7. The method of claim 1, wherein the PFL information transmitting step comprises transmitting a radio resource control (RRC) message comprising the PFL information to the UE on a dedicated control channel (DCCH).

8. The method of claim 1, further comprising:
   receiving a frequency change request from the UE and performing a hard handover to a requested frequency after the PFL information transmitting step.

9. A method of providing a multimedia broadcast/multicast service (MBMS) service to user equipment (UE) in a drift radio network controller (DRNC), the method comprising:
   receiving, by the DRNC, a radio link setup or addition request for the UE from a serving radio network controller (SRNC) when the UE moves to a cell controlled by the DRNC while receiving the MBMS service;
   upon receiving the link setup or addition request from the SRNC, checking, by the DRNC, preferred frequency layer (PFL) information indicating the PFL of at least one MBMS service which the UE has joined and of which the at least one MBMS service has started; and
   transmitting, by the DRNC, the PFL information to the SRNC.

10. The method of claim 9, wherein the PFL information comprises a downlink universal terrestrial radio access (UTRA) absolute radio frequency channel number (DL UARFCN) indicating the PFL of the at least one MBMS service, and a temporary MBMS group identity (TMGI) indicating the ID of the at least one MBMS service.

11. The method of claim 9, wherein the PFL information is included in a radio link setup response message.

12. The method of claim 9, wherein the PFL information is included in a radio link addition response message.

13. The method of claim 9, further comprising:
   requesting registration of the MBMS service for the UE to a serving general packet radio services (GPRS) support node (SGSN) upon receipt of the radio link addition request; and
   generating an MBMS context for the MBMS service, and linking the UE to the MBMS context.

14. The method of claim 9, wherein the PFL information comprises PFLs other than a frequency most selected as a PFL in cells controlled by the DRNC.

15. A serving radio network controller (SRNC) for providing a multimedia broadcast/multicast service (MBMS) service to user equipment (UE), comprising:
   a UE mobility manager for detecting movement of the UE to a new cell controlled by a drift radio network controller (DRNC), the UE configured to receive the MBMS service and determining whether the new cell is managed by the UE mobility manager;
   an interface for transmitting a radio link setup or addition request message to the DRNC and upon transmitting the radio link setup or addition request message to the DRNC, receiving a response message comprising preferred frequency layer (PFL) information indicating the PFL of at least one MBMS service which the UE has joined and of which the at least one MBMS service has started in the new cell from the DRNC;
   a frequency layer convergence (FLC) controller for managing the PFL information; and
   a radio link control (RRC) transmitter and receiver for transmitting the PFL information to the UE.

16. The SRNC of claim 15, wherein the PFL information comprises a downlink universal terrestrial radio access (UTRA) absolute radio frequency channel number (DL UARFCN) indicating the PFL of the at least one MBMS service, and a temporary MBMS group identity (TMGI) indicating the ID of the at least one MBMS service.

17. The SRNC of claim 15, wherein the UE mobility manager receives a frequency change request from the UE and performs a handover to a requested frequency.

18. The SRNC of claim 15, wherein the UE mobility manager requests radio link setup to the DRNC in the absence of a radio link for the UE in the DRNC.

19. The SRNC of claim 15, wherein the UE mobility manager requests radio link addition to the DRNC in the presence of a radio link for the UE in the DRNC.

20. The SRNC of claim 15, wherein the RRC transmitter and receiver transmits an RRC message comprising the PFL information to the UE.

21. A drift radio network controller (DRNC) for providing a multimedia broadcast/multicast service (MBMS) service to user equipment (UE), comprising:
   an interface for receiving a radio link setup or addition request message for the UE from a serving radio network controller (SRNC) when the UE moves to a new cell controlled by the DRNC and upon receiving the link setup or addition request message from the SRNC, transmitting to the SRNC a response message comprising preferred frequency layer (PFL) information indicating the PFL of at least one MBMS service which the UE has joined and of which the at least one MBMS service has started;

a UE context manager for managing a UE context comprising the PFL information;

a radio link manager for receiving the radio link setup or addition request from the interface and providing the PFL information to the interface; and a radio transmitter and receiver for setting up or adding a radio link for the UE upon request of the radio link manager and transmitting MBMS service data to the UE on the radio link.

22. The DRNC of claim 21, wherein the PFL information comprises a downlink universal terrestrial radio access (UTRA) absolute radio frequency channel number (DL UARFCN) indicating the PFL of the at least one MBMS service, and a temporary MBMS group identity (TMGI) indicating the ID of the at least one MBMS service.

23. The DRNC of claim 21, wherein the PFL information comprises PFLs other than a frequency most selected as a PFL in cells controlled by the DRNC.

24. The DRNC of claim 21, wherein the UE context manager generates an MBMS context for the UE and links the UE to the MBMS context upon request of the radio link manager.

* * * * *